Figure 1:
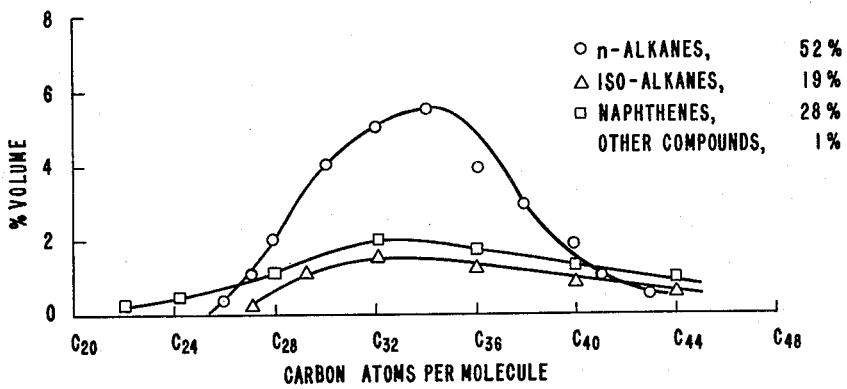

June 29, 1965     K. G. ARABIAN ET AL     3,192,062

WAX COMPOSITION AND SHEET MATERIALS COATED THEREWITH

Filed May 31, 1962

MASS SPECTROMETRIC ANALYSIS OF HEAVY DISTILLATE WAX

MASS SPECTROMETRIC ANALYSIS OF LOWER MELTING 64.5% OF HEAVY DISTILLATE WAX

INVENTORS:
KAREKIN G. ARABIAN
JOHN C. MUYRES
BY: *William H. Myers*
THEIR AGENT

3,192,062
WAX COMPOSITION AND SHEET MATERIALS COATED THEREWITH

Karekin G. Arabian and John C. Muyres, Houston, Tex., assignors to Shell Oil Company, New York, N.Y., a corporation of Delaware
Filed May 31, 1962, Ser. No. 198,857
6 Claims. (Cl. 106—270)

This invention relates to improved wax compositions and sheet materials coated therewith. More particularly, it relates to compositions of certain petroleum wax fractions and polymers for use in coating sheet materials and obtaining substantially improved properties, particularly with respect to seal strength and gloss stability over a wide range of temperatures. Moreover, high blocking point compositions result from the compositions of this invention.

Paper coatings particularly for use in the wrapping of food products normally comprise waxes mixed with certain polymers (usually low molecular weight polyethylenes). The primary properties useful for this purpose include especially high sealing strength, high gloss stability and high blocking temperature. While the specific requirements will vary somewhat depending on the particular end use, e.g., bread wraps vs. frozen food wraps, these properties are required to a greater or less extent in substantially all wax coatings for wrapping purposes.

It is normal practice to utilize mixtures of microcrystalline wax with distillate waxes, the combination being modified further with one of the polymers referred to above. In the absence of microcrystalline waxes, distillate paraffin waxes are usually too brittle, particularly at relatively low temperatures such as room temperature and below. This also results in a relatively low seal strength of the composition.

In addition to the desire to improve existing compositions, there is a relative shortage of microcrystalline wax compared with distillate waxes. Moreover, microcrystalline waxes command relatively higher prices. Consequently, there is an existing desire to improve wax coatings containing a minimum amount or complete absence of microcrystalline wax. Up to the present time, no satisfactory result has been obtained (except in a very limited sense) with coating compositions comprising a polymer combined only with distillate paraffin waxes. The paraffin waxes obtained from low-boiling or medium-boiling distillates are useful for many purposes, but predominate in straight-chain paraffin waxes which result in brittle properties and low sealing strength until they are modified with substantial proportions of microcrystalline wax.

Somewhat improved results are obtained by the use of heavy distillate waxes which will be described further hereinafter. Heavy distillate waxes are obtained from the highest boiling distillates and differ materially from the waxes obtained from lower boiling petroleum distillates in containing a reduced amount of normal paraffin waxes and a correspondingly increased amount of isoparaffins and cycloparaffins (naphthenes). Such waxes can be used in conjunction with a certain very limited class of low molecular weight polyethylenes to provide wax compositions having improved sealing strength. Even in this case, experience has shown that it is substantially essential to include microcrystalline wax in a substantial amount if high sealing strength is to be obtained. Otherwise if microcrystalline wax is to be eliminated from the wax composition it is necessary to utilize excessive proportions of low molecular weight polyethylenes of a particular structure in order to obtain sealing strength of a desired magnitude. If polyethylenes are of a different type than those found to be satisfactory in the latter instance are employed, even in amounts of 10–20%, the sealing strength of the compositions have been shown to be unsatisfactory.

It is an object of the present invention to provide improved wax compositions. It is a particular object of the invention to provide wax-polymer compositions having high seal strength and good gloss stability. Other objects will become apparent during the following description of the invention.

Now, in accordance with the present invention, it has been found that wax compositions having substantially improved sealing strength and gloss stability as well as high blocking point comprise a major proportion of the wax obtained by the splitting of heavy distillate wax so as to eliminate a substantial proportion of the higher boiling normal paraffin waxes therefrom, and modifying the resulting split wax of reduced high boiling normal paraffin content with a minor proportion of polyalkenes. More particularly in accordance with the present invention, it has been found that heavy distillate waxes can be solvent-fractionated to remove therefrom a substantial proportion of the normal paraffins having in excess of 36 carbon atoms per molecule and also removing a substantial amount of the normal paraffins having in excess of 31 carbon atoms per molecule to obtain a wax which is more broadly responsive to a wider variety of polyalkenes for the purpose of obtaining wax compositions of substantially improved sealing strength. Also, in accordance with the present invention, a paper product is provided bearing a coating of a wax composition as described above. Laminated sheet products containing as the laminated adhesive the wax composition of the invention are also provided by this invention.

The significant aspect of the present invention comprises the unexpected finding that polyalkenes having a molecular weight below about 50,000 are useful for the improvement in sealing strength and gloss stability of the heavy distillate wax fraction described above regardless of their specific gravity (density) or their degree of branching if any. This is in direct contradiction to the results obtained with heavy distillate waxes from which the high boiling normal paraffin waxes have not been removed. In the latter instance, it has been found that the class of polyalkenes is restricted to polyethylenes having at least 7–12% of its carbon atoms present as branched chain atoms and having a relatively low density between .88 and .91. In accordance with the present invention, no such restriction has been encountered. This would appear to be due to the substantial reduction in the normal paraffin content as more fully described hereinafter.

Of course, in accordance with the present invention, it is possible and at times desirable to incorporate microcrystalline wax or lower molecular weight paraffin waxes (or both) in the wax-polymer compositions of the invention, but this is not necessary or even desirable in all instances. In accordance with the present invention, a preferred aspect comprises the use of polyalkenes having from 2–25,000 average molecular weight. It has been found that while the entire spectrum of polyalkenes may be utilized for this purpose, it is preferred to use relatively high density materials having 0.915 to 0.960 density regardless of their degree of branching if any. In addition, however, it is also possible to employ relatively lower density materials which may or may not have branched chain atoms, said materials having a density range between about 0.880 and 0.915.

The essential starting material from which the desired heavy distillate wax fraction is obtained comprises the heavy distillate wax from a petroleum distillate. This wax normally has a melting point range of 145–175° F., preferably 150–165° F. These are usually obtained from high viscosity lubricating oil distillate fractions having a Saybolt Universal viscosity at 210° F. of at least 65 seconds and usually between about 65 and 160 seconds. The heavy distillate is preferably dewaxed by diluting it with a dewaxing solvent such as naphtha or mixed solvents such as ketones mixed with aromatics, e.g., methyl ethyl ketone or methyl isobutyl ketone and toluene. The diluted waxy oil is cooled to a dewaxing temperature which is predetermined to give a wax having the following typical properties:

COMPOSITIONAL ANALYSIS [1]

| Components | Percent v. | Carbon No. range | Avg. carbon No. |
|---|---|---|---|
| n-Alkanes | 68 | $C_{22}$–$C_{45}$ | $C_{36}$ |
| Isoalkanes | 8 | $C_{29}$–$C_{45}$ | $C_{35}$ |
| Monocycloalkanes | 17 | $C_{25}$–$C_{46}$ | $C_{37}$ |
| Dicycloalkanes | 6 | $C_{29}$–$C_{46}$ | $C_{40}$ |
| Others | 1 | $C_{34}$–$C_{47}$ | $C_{38}$ |

[1] By high-temperature mass spectrometer.

PHYSICAL PROPERTIES

| | |
|---|---|
| Melting point, ASTM D-87 | 158.2 |
| Viscosity, SU at 210°F | 51.4 |
| Color, Saybolt | +28 |
| Refractive index, $n_D^{60}$ | 1.4393 |
| Oil content, percent w., ASTM D-721 | 1.2 |
| Penetration, mm./10, ASTM D-1321: | |
| At 77°F | 12 |
| At 110°F | 40 |
| Tensile strength, p.s.i., 73°F., ASTM D-1320 | 186 |
| Blocking temperature, °F., gradient method, pick/block | 123/128 |

DISTILLATION RANGE

| Percent v. over— | Temperature, ° F. |
|---|---|
| IBP | 675 |
| 20 | 860 |
| 40 | 890 |
| 60 | 916 |
| 80 | 954 |

FIGURE 1 shows the distribution of wax components in a typical heavy distillate wax. It will be noted that this typical heavy distillate wax contains 43.5% w. of normal paraffins. As the table above shows, another typical heavy distillate wax contains a substantially higher proportion of normal paraffins (68%) with an average carbon number of 36. It will be immediately apparent that such heavy distillate waxes, while having some desirable properties, would also tend to have relatively poor sealing strength properties due to this high proportion of high-molecular-weight normal paraffin hydrocarbon. Thus, in accordance with the present invention, it was found possible to substantially improve the properties of heavy distillate wax by removing therefrom by solvent fractionation (splitting) a substantial proportion of the normal paraffins, such that the fraction utilized as the essential wax of the present invention is one having less than 20% by weight of normal paraffin waxes having in excess of 31 carbon atoms per molecule and less than 5% by weight of normal paraffin hydrocarbons having in excess of 36 carbon atoms per molecule. It will be noted according to the table above and to FIGURE 1 that two typical heavy distillate waxes not modified by solvent fractionation would not meet these two important and essential criteria.

The removal of normal paraffin waxes from heavy distillate wax is preferably accomplished by dissolving the wax in a dewaxing solvent and chilling to such a temperature that the normal paraffins of relatively high molecular weight preferentially precipitate and are removed by centrifuging or filtration. The dewaxing solvent is then further chilled to cause precipitation of the remaining fraction of heavy distillate wax. This may be done stage-wise so as to separate more than one heavy distillate wax of coating grade if such is desired. However, this has not been found to be essential. The usual dewaxing solvents and conditions may be employed and are known in the art to experts in the art of dewaxing.

It is to be emphasized that the removal of the substantial amount of high molecular weight normal paraffin hydrocarbons is not to be regarded as a mere refining procedure such as crude waxes are usually subjected to. In the latter instance, crude waxes usually comprise waxes contaminated with various amounts of lubricating oils with which they are naturally associated. In this case, the waxes are purified by solvent recrystallization so as to eliminate the oil components therefrom but also in the interest of most efficient operation conditions are adjusted such that substantially all of the wax components are crystallized.

Contrasted to this, in the present instance, the solvent fraction comprises a major splitting of waxes which have already been previously subjected to deoiling. Consequently, the solvent fractionation results in a splitting of a heavy distillate wax usually having less than 2% by weight of oil into two major fractions, one of which comprises the relatively high-boiling normal paraffin hydrocarbons which it is desired to eliminate and the other of which comprises the heavy distillate wax fraction utilized in the compositions of this invention.

Figure 2:
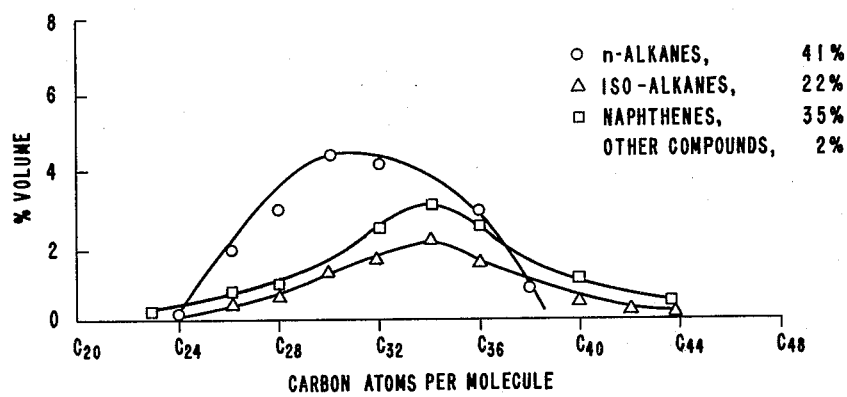

The results of a typical splitting operation of this type are shown in FIGURE 2. The heavy distillate wax of FIGURE 1 was subjected to a splitting operation utilizing a mixture of methyl ethyl ketone and toluene. The conditions of temperature and volume of splitting solvents were adjusted to the point where 20–25% by weight of the original heavy distillate wax of FIGURE 1 were removed by chilling to cause precipitation. The wax so removed is shown in FIGURE 2 and it is immediately apparent that the chief results obtained by the use of the splitting operation was the removal of normal paraffin hydrocarbons having from 32 to 44 carbon atoms per molecule which constitutes 74% of the fraction removed. The remaining waxy materials removed in this splitting operation could actually have been isolated and replaced in the heavy distillate wax fraction utilized in the compositions of the invention, but this would be a relatively inefficient operation.

The proportion and identity of the dewaxing solvent and the temperature of dewaxing is dependent in large part upon the proportion of high-molecular-weight normal paraffin hydrocarbons which must be removed. As is indicated by the heavy distillate of the table given hereinbefore and that of FIGURE 1, the proportion of high-boiling point normal alkanes in a heavy distillate wax may vary over wide limits. Consequently, it is left to experts in the art to choose the specific splitting conditions necessary for the processing of a specific heavy distillate wax to remove therefrom the undesirable high-molecular weight normal alkanes.

Regardless of the conditions employed, one aspect of the present invention comprises as a new composition of matter, a heavy distillate petroleum wax fraction having a melting point of 145–155° F., containing less than about 20% by weight of normal hydrocarbon waxes having in excess of 31 carbon atoms per molecule, less than 5% by weight of normal paraffin hydrocarbons having in excess of 36 carbon atoms per molecule, and less than 2% by weight of normally oily petroleum fractions, e.g., lubricating oil. The wax fractions so described will comprise a major proportion of isoparaffins and naphthenes, the specific composition of which will vary from one crude source to another. It is to be emphasized that heavy oil-contaminated heavy distillate wax fractions are not regarded as the products of this invention, since they are essentially useless without further purification to remove the oil fractions either by distillation or by solvent fractionation. The aspect of the invention which is of concern here is of the essentially oil-free, e.g., less than 2% oil, heavy distillate wax fraction from which high molecular weight normal alkanes have been removed by solvent fractionation.

The polymers with which the heavy distillate fractions described and claimed herein are combined preferably comprise polyalkanes having from 2,000 to 50,000 average molecular weight. However, other polymers may be utilized as well, including particularly copolymers of ethylene with esters of a $C_{2-6}$ aliphatic monohydric aliphatic alcohol and a $C_{2-6}$ aliphatic monocarboxylic acid, said ester having one carbon to carbon double bond, the copolymer having an ester content of 15-40% by weight. In addition to the polyethylenes described hereinbefore, other polyalkenes which may be utilized include polypropylenes and, preferably, copolymers of ethylene with higher monoolefins, preferably copolymers of ethylene with propylene in which the polymer contains 80-95 moles of bound ethylene per mole of bound propylene. While these copolymers normally are supplied as higher molecular weight polymers, they may be utilized as such or converted to lower molecular weight polymers if desired by selective degradation.

Suitable unsaturated ester-containing copolymers comprise particularly copolymers of ethylene with ethyl acrylate or of ethylene with vinyl acetate, as well as homologues and analogues of saturated esters.

The polymers are utilized in the compositions of the present invention in any desired amount for particular purposes. For coating purposes, the polymers are employed in amounts varying from about 0.1 to about 20% by weight of the total coating composition. For other purposes the proportion of polymer may be substantially higher. In fact, it may even constitute a major component of the composition while wax constitutes a minor component thereof. Such materials are useful for molding purposes or for the casting of self-supporting films, as well as for laminating compositions.

The following examples illustrate the compositions and advantages of the present invention. The sealing strength referred to therein was determined by the following tests:

SEALING STRENGTH DETERMINATION

The specific materials and operating conditions used to obtain the results in the present report are as follows:

(1) Sulfite paper, 24 lb./ream, supplied by United States Testing Company as TAPPI-ASTM standard paper was used.

(2) The coating operation for blends with 5% polymer was conducted with a 2-inch waxing machine at a waxing temperature of 200-206° F., with metering rods number 8 and 10, at a paper speed of 50 ft./min., with the cooling water at a temperature of 60° F.

(3) The wax was applied to the side of the paper which stains more severely with iodine solution.

(4) The sealing operation was conducted at a heated roll temperature of 220° F., at a paper speed of 50 ft./min., with the chill water temperature at 60° F.

(5) The sealing strength determination was carried out at an angle of approximately 60 degrees (0.31 to 0.38 on the scale readings).

(6) In reporting values, two numbers are given (e.g., 220/<90 g./in.). The first number represents the force required to start delamination; the second number represents the force required to continue the delamination after it has started.

The reproducibility of sealing strength values at the 100-250 g./in. level is ±10%.

*Example I.*—A heavy distillate having the following typical properties was deoiled to yield a heavy distillate wax employed in the described splitting operation.

Typical properties of heavy distillate

| | |
|---|---|
| Gravity, API at 60° F. | 24.1 |
| Initial boiling point, ° F. | 752 |
| 10% Overhead, ° F. | 852 |
| 50% Overhead, ° F. | 913 |
| Flash Point, Cleveland Open Cup, ° F. | 500 |
| Viscosity, SSU at 210° F. | 76.3 |

The heavy distillate wax so obtained had a melting point of 158-162° F. and was composed of a hydrocarbon as shown in FIGURE 1. The unsplit heavy distillate wax had the following properties:

| | Charge |
|---|---|
| Melting point, ° F. (D-87) | 160.7 |
| Congealing point, ° F. (D-938) | 161.5 |
| Oil content, percent w. | 1.0 |
| Penetration, dmm., at 77° F. | 12 |
| Refractive index at 90° C. | 1.4393 |
| Gradient block, ° F., neat | 115/128 |
| Sealing Strength,[1] g./in., neat, 75° F. | 62/62 |

[1] On sulfite paper.

This heavy distillate wax was split, utilizing a splitting solvent comprising 61.5 volume percent of methylethyl ketone and 38.5 volume percent of toluene. The conditions of the splitting operations were as follows:

Wax splitting conditions

| | |
|---|---|
| Recrystallization dilution ratios: | |
|   1st (primary filtrate) | 1.5 |
|   2nd (secondary filtrate) | 1.0 |
|   3rd (primary filtrate) | 1.0 |
|   4th (secondary filtrate) | 3.7 |
|   Total recrystallization dilution | 7.2 |
| Repulp dilution ratio (sec. filtrate) | 1.5 |
| Cold wash ratios (fresh solvent): | |
|   Recrystallization | 4.1 |
|   Repulp | 2.8 |
| Filter drum speeds, min./rev.: | |
|   Recrystallization | 1¾ |
|   Repulp | 3¼ |
| Filtrate recirculation ratios: | |
|   Recrystallization | 13 |
|   Repulp | 10 |
| Charge solvent mix temperatures, ° F.: | |
|   Cooler outlet | 186 |
|   Double pipe exchanger outlet | 142 |
|   Primary filtration | 112 |
|   Secondary filtration | 111 |
| Solvent: | |
|   Methyl ethyl ketone, v. percent | 61.5 |
|   Toluene, v. percent | 58.5 |

This operation resulted in the separation of two waxes, a higher melting point fraction and the desired lower melting point fraction having a reduced high-molecular-weight normal paraffin content. The constitution of each of these fractions is given in FIGURE 2. The physical properties of these fractions both with and without polyethylene are as follows:

Yields and properties of products—RAW 158/162° F. M.P. wax splitting

| | |
|---|---|
| Charge: | |
|   Congealing point, ° F. (D-938) | 161.5 |
|   Melting point, ° F. (D-87) | 160.7 |
|   Oil, percent w. | 1.0 |
|   Penetration, dmm., at 77° F. | 12 |
|   Refractive index, 90° C. (194° F.) | 1.4393 |
|   Blocking temperature, ° F. | 115/128 |
|   Sealing strength, g./in.— | |
|     Neat, 75° F. | 62/62 |
|     Neat, 80° F. | 160/0 |
|     +5% polyethylene, 75° F. | 113/0 |
|     +5% polyethylene, 85° F. | — |
| Lower M.P. fraction: | |
|   Yield, percent w. | [1] 75 |
|   Congealing point, ° F. (D-938) | 147.0 |
|   Melting point, ° F. (D-87) | 148.3 |
|   Oil, percent w. | 1.2 |
|   Sealing strength, g./in.[2]— | |
|     At 75° F. | 252/252 |
|     At 85° F. | 215/215 |
|   Blocking temperature, ° F.[2] | 129/134 |

[1] Calculated basis specific gravity.
[2] With 5% polyethylene (0.88 density, 7000 mol. wt.).

Lower M.P. fraction:—Continued
- Blocking temperature, neat _____ 105/110
- Penetration, dmm.—
  - At 77° F. _____ 24
  - At 100° F. _____ 38
- Refractive index at 90° C. (194° F.) ___ 1.4400

Higher M.P. fraction:
- Congealing point, ° F. (D-938) _____ 174.0
- Melting point, ° F. (D-87) _____ 173.5
- Oil, percent w. _____ 0.1
- Blocking temperature, ° F. _____ 140/>145
- Penetration, dmm.—
  - At 77° F. _____ 11
  - At 100° F. _____ 16
- Refractive index—
  - At 90° C. _____ 1.4343
  - At 100° C. _____ 1.4300

*Example II.*—Other splitting operations were carried out utilizing the same heavy distillate wax but employing as the splitting solvent 10 volumes per volume of wax of methyl isobutyl ketone. The following fractions were obtained.

*Splitting of heavy distillate wax* [1]

| Run No. | A | B | C |
|---|---|---|---|
| Splitting temperature, ° F | 127 | 123 | 118 |
| Lower-melting fraction: | | | |
| Yield, percent w | 82.5 | 72.0 | 64.5 |
| Congealing point, ° F | 153.5 | 152.0 | 151.0 |
| Higher-melting fraction: | | | |
| Yield, percent w | 17.5 | 28.0 | 35.5 |
| Congealing point, ° F | 175.5 | 173.5 | 171.0 |

[1] Splitting was done with 10/1 MIBK single dilution, followed by 1/1 MIBK wash at the splitting temperature.

The fractions described in the table above were tested in combinations with 5% of a polyethylene for sealing strength, block temperature and gloss stability. For the purpose of comparison, a blend of the sample polyethylene with unsplit heavy distillate wax was included in tests as well as a typical bread wrap blend containing a combination of heavy distillate wax, microcrystalline wax and polyethylene. The results obtained are given in the table which follows:

We claim as our invention:

1. As a new composition of matter, (a) a major proportion of heavy distillate petroleum wax fraction having a melting point of 145-155° F. containing less than 20% normal paraffin waxes having in excess of 31 carbon atoms per molecule said fraction having been prepared by splitting of a deoiled heavy distillate petroleum wax fraction to remove relatively high-boiling normal paraffin hydrocarbons, and less than 5% normal paraffin hydrocarbons having in excess of 36 carbon atoms per molecule, and (b) 0.1-20% by weight of a polyethylene having an average molecular weight of 2000-50,000.

2. A paper product bearing a coating of a composition according to claim 1.

3. A composition according to claim 1 containing in addition thereto 1-25% by weight of a distillate paraffin wax having a melting point of 125-143° F.

4. A composition according to claim 1 containing in addition thereto 1-25% by weight of a residual microcrystalline petroleum wax.

5. A composition according to claim 1 containing in addition thereto 1-25% by weight each of a distillate paraffin wax having a melting point of 125-143° F. and a residual microcrystalline wax.

6. As a new composition of matter, (a) 85-99% by weight of a distillate petroleum wax having a melting point of 147-152° F., containing less than about 18% normal paraffins having in excess of 31 carbon atoms per molecule and less than about 4% normal having in excess of 36 carbon atoms per molecule said fraction having been prepared by splitting of a deoiled heavy distillate petroleum wax fraction to remove relatively high-boiling normal paraffin hydrocarbons, and (b) 1-15% by weight of a polyethylene having an average molecular weight of 3500-10,000.

References Cited by the Examiner

UNITED STATES PATENTS 3,014,003  12/61  Arabian _____ 106—270

ALEXANDER H. BRODMERKEL, *Primary Examiner.*

JOSEPH REBOLD, *Examiner.*

*Performance of low-melting waxes from laboratory splitting of heavy distillate wax*

| | Sealing strength at 75° F., g./in. (max./min.)[1] | Blocking temp., ° F. (pick/final) | Gloss stability,[2] units of loss | | |
|---|---|---|---|---|---|
| | | | 7 days, 73°F. | 24 hr., 105°F. | 24 hr., 110°F. |
| Unsplit heavy distillate wax+5% polyethylene[3] | 113/90 | 140/142 | 0 | 0 | 0 |
| Lower melting 82.5% fraction from splitting+5% polyethylene | 190/90 | 138/141 | 0 | 0 | 0 |
| Lower melting 72% fraction from splitting+5% polyethylene | 254/126 | 135/140 | 0 | 0 | 0 |
| Lower melting 64.5% fraction from splitting+5% polyethylene | 252/252 | 131/138 | 0 | 0 | 0 |
| Bread-wrap blend[4] | 299/90 | 138/140 | 0 | 0 | 0 |

[1] In reporting sealing strength values, the first number represents the forces required to begin tearing apart the sealed specimens; the second number represents the force required to continue delamination after it has started.
[2] Gloss stability was run on cardboard; initial glosses were all between 90 and 95.
[3] Polyethylene is a 0.91 density, 12,000 molecular weight polyethylene.
[4] An example of a bread-wrap blend is listed for comparison. The blend contains 57% heavy distillate wax, 38% microcrystalline wax and 5% polyethylene.